United States Patent [19]

Honda et al.

[11] 4,317,862
[45] Mar. 2, 1982

[54] SANDWICH GLASS

[75] Inventors: Toshio Honda, Akigawa; Itsuo Tanuma, Tokorozawa; Masao Ogawa, Kawagoe; Hikaru Ishikawa, Kokubunji; Yukio Fukuura, Kodaira; Setsuo Akiyama; Shozo Ojima, both of Higashimurayama; Kazuo Naito, Kodaira, all of Japan

[73] Assignee: Bridgestone Tire Company Limited, Tokyo, Japan

[21] Appl. No.: 108,093

[22] Filed: Dec. 28, 1979

[30] Foreign Application Priority Data

Dec. 28, 1978 [JP] Japan .................................. 53-161003

[51] Int. Cl.³ ........................ B32B 17/10; B32B 27/30
[52] U.S. Cl. .............................. 428/442; 204/159.15; 204/159.16; 204/159.17; 428/441; 428/500; 428/521; 428/522
[58] Field of Search ............... 428/442, 441, 500, 521, 428/522; 204/159.15, 159.16, 159.17

[56] References Cited

U.S. PATENT DOCUMENTS

| | | | |
|---|---|---|---|
| 3,984,500 | 10/1976 | Dickie | 428/442 |
| 3,987,127 | 10/1976 | Dickie | 428/442 |
| 3,992,477 | 11/1976 | Dickie | 428/442 |
| 4,129,487 | 12/1978 | Makuuchi | 428/442 |
| 4,134,810 | 1/1979 | Oraki | 428/442 |
| 4,199,421 | 4/1980 | Kamada | 428/442 |

*Primary Examiner*—Ellis P. Robinson
*Attorney, Agent, or Firm*—Sughrue, Mion, Zinn, Macpeak and Seas

[57] ABSTRACT

A sandwich glass having an intermediate layer formed of a photosensitive resin consisting mainly of an acryloyloxy group- or methacryloyloxy group-containing high polymer and at least one of acrylic acid, methacrylic acid and acryloyloxy group- or methacryloyloxy group-containing compound is excellent in the adhesion between the intermediate layer and the glass plates and has high impact absorbing ability, light resistance and heat resistance.

5 Claims, No Drawings

SANDWICH GLASS

BACKGROUND OF THE INVENTION (1) Field of the Invention

The present invention relates to a sandwich glass used in the front glass of automobile and other window glasses.

(2) Description of the Prior Art

Polyvinylbutyral series resins have hitherto been commonly used in the intermediate layer of sandwich glass. However, polyvinylbutyral series resin is thermoplastic, and has various problems in the production of sandwich glass and in the resulting sandwich glass.

That is, the use of the resin has the following drawbacks.

(1) A sticking operation for glass plates must be carried out at a temperature higher than the softening temperature of the resin.

(2) Bubbles are sometimes formed in the intermediate layer during the sticking operation for glass plates, and when two glass plates have been once stuck to each other through the intermediate layer, it is substantially impossible to peel off the glass plates from each other.

(3) After sticking operation, glass plates sometimes move or bubbles are formed due to heat.

(4) The resin is insufficient in the adhesive force, and therefore when the resulting sandwich glass is broken due to impact, the glass plates are sometimes peeled off from the intermediate layer to cause scattering of broken glass pieces.

(5) The adhesive force of the resin deteriorates due to the presence of water with the lapse of long period of time.

SUMMARY OF THE INVENTION

The object of the present invention is to provide a novel sandwich glass not having the above described drawbacks.

That is, the feature of the present invention is the provision of a sandwich glass, comprising glass plates and an intermediate layer interposed therebetween, said intermediate layer being formed by photosetting a photosensitive resin consisting mainly of a mixture of a high polymer having acryloyloxy group- or methacryloyloxy group-containing groups represented by the following formulae (I)–(III),

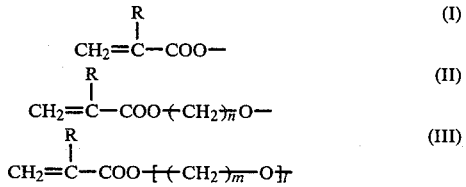

wherein R represents a hydrogen atom or methyl group, n represents a positive integer of 2–5, m represents a positive integer of 1–4 and l represents a positive integer of 1–30, and at least one acryloyloxy group- or methacryloyloxy group-containing compound selected from acrylic acid, methacrylic acid and their derivatives.

The resin to be used as the intermediate layer of the sandwich glass is a photosensitive resin, which can be easily crosslinked by light and can stick glass plates through the resin at room temperature. The resin has a proper viscosity, and does not cure until light is irradiated to the resin. Therefore, when two glass plates are put together, if foreign substances or bubbles are observed between the superposed glass plates, the glass plates can be once peeled off and can be again put together. While, when light is irradiated to a glass assembly having an intermediate resin layer, the resin is easily cured and adhered tightly to the glass plates. Therefore, formation of bubbles and moving of glass plates due to heat do not occur, and even when water is present, a high adhesion strength can be maintained for a long period of time. Moreover, peeling of the intermediate layer from the glass plates due to impact does not occur at the breakage of the resulting sandwich glass, and the broken glass pieces do not scatter. Further, the sandwich glass of the present invention has the following merits. When an elastomeric high polymer is used as the high polymer, the resulting intermediate layer can absorb impact due to collision of stone and the like. For example, when a person has struck his head on the sandwich glass, the intermediate layer acts to decrease the wound of the head due to impact. Moreover, since the high polymer and monomer ester used in the intermediate layer form primary bonding with each other, the layer is homogeneous and highly transparent. Accordingly, the sandwich glass of the present invention can be advantageously used as a front glass of automobile and further as a window glass of vehicles and skyscrapers.

DESCRIPTION OF THE PREFERRED EMBODIMENT

The photosensitive resin to be used as the intermediate layer of the sandwich glass of the present invention consists mainly of a high polymer having acryloyloxy group- or methacryloxyloxy group-containing groups and a specifically limited compound having an acryloyloxy group or methacryloyloxy group. The acryloyloxy or mehtacryloyloxy group contained in the high polymer is represented by the following general formulae (I)–(III):

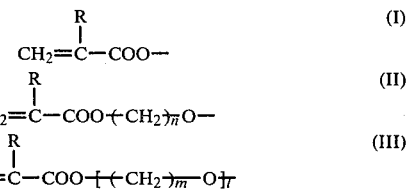

wherein R represents a hydrogen atom or methyl group, n represents a positive integer of 2–5, m represents a positive integer of 1–4 and l represents a positive integer of 1–30.

The high polymer having the above described functional group can be obtained, as described in Japanese Patent Application Publication No. 6,198/78, by adding acrylic acid, methacrylic acid or their ester having a terminal active hydrogen atom to a high polymer having olefinically unsaturated double bonds in the presence of alkyl hypohalite or N-haloamide compound.

The above described high polymer having olefinically unsaturated double bonds can be selected from a wide range. However, elastomeric high polymers having olefinically unsaturated double bonds, such as natural rubber, cis-1,4-polyisoprene, cis-1,4-polybutadiene, polychloroprene, butadiene-styrene copolymer, butadiene-acrylonitrile copolymer, isobutylene-isoprene copolymer, acrylic acid-butadiene copolymer, methyl methacrylate-butadiene copolymer, ethylene-propylene-cyclopentadiene copolymer, ethylene-propylene-5-ethylidene-2-norbornene copolymer, ethylene-propylene-1,4-hexadiene copolymer and the like, are advantageously used due to their high impact absorbing property. Of course, when the intermediate layer is not required to have impact absorbing property, high polymers other than the above described ones can be used, for example, trans-1,4-polybutadiene, 1,2-polybutadiene and the like.

In the present invention, high polymers containing an optional amount of acryloyloxy groups or methacryloyloxy groups can be used. However, high polymer containing an extremely small amount of acryloyloxy groups or methacryloyloxy groups is poor in the affinity to the acryloyloxy group- or methacryloyloxy group-containing compound used as another component of the intermediate layer resin, and the resulting intermediate layer is poor in the transparency. Therefore, the amount of the above described functional groups contained in the high polymer must be at least one group per 50,000 of its molecular weight, and is preferably at least one group per 20,000 of its molecular weight.

Another main component for the intermediate layer resin is an acryloyloxy group- or methacryloyloxy group-containing compound selected from acrylic acid, methacrylic acid and their derivatives. As the derivatives of acrylic acid or methacrylic acid, esters and amides are most generally used. The alcohol residues of the esters are, for example, alkyl groups, such as methyl group, ethyl group, dodecyl group, stearyl group, lauryl group and the like, cyclohexyl group, tetrahydrofurfuryl group, aminoehtyl group, 2-hydroxyethyl group, 3-hydroxyethyl group, 3-chloro-2-hydroxylpropyl group and the like. Further, esters of acrylic acid or methacrylic acid with ethylene glycol, triethylene glycol and polyethylene glycol can be used. As the amide of acrylic acid or methacylic acid, diacetoneacrylamide is most commonly used.

The mixing ratio of the high polymer to the acryloyloxy group- or methacryloxyloxy group-containing compound in the intermediate layer resin is preferably 90/10-5/95 in weight ratio. When the amount of the high polymer exceeds 90 parts by weight, crosslinking reaction does not occur suffiently during the photosetting, and the cured film is poor in the adhesion. Reversely, when the amount of the high polymer is smaller than 5 parts by weight, the cured film is too hard and is poor in the shock absorbing property. The high polymer or the acryloyloxyl group- or methacryloxyloxy group-containing compound may be used in the form of a mixture of the above described high polymers or of the above described acryloyloxy group- or methacryloyloxy group-containing compounds respectively, in so far as the weight ratio of the high polymer to the acryloyloxy group- or methacryloyloxy group-containing compound is within the range of 90/10-5/95.

In the present invention, in order to improve the adhesion of the intermediate layer to glasses, the intermediate layer resin may contain less than 10% by weight of a commonly known silane coupling agent. As the silane coupling agent, there can be used γ-chloropropylmethoxysilane, vinyltrichlorosilane, vinyltriethoxysilane, vinyl-tris(β-methoxyethoxy)silane, γ-methacryloxypropyl-trimethoxysilane, β-(3,4-ethoxycyclohexyl)ethyl-trimethoxysilane, γ-glycidoxypropyl-trimethoxysilane, vinyl-triacetoxysilane, γ-mercaptopropyl-trimethoxysilane, γ-aminopropyl-triethoxysilane, N-β-(aminoethyl)-γ-aminopropyl-trimethoxysilane and the like.

Further, in order to regulate the curing velocity of the resin, not more than 10% by weight of photosensitizer, such as benzoin, benzophenone, benzoin ethyl ether, benzoin isopropyl ether, benzoin isobutyl ether, dibenzyl, 5-nitroacenaphthene, hexachlorocyclopentadiene, paranitrodiphenyl, paranitroaniline, 2,4,6-trinitroaniline, 1,2-benzanthraquinone, 3-methyl-1,3-diaza-1,9-benzanthrone or the like, may be contained in the resin. Further, in order to improve the storage stability of the resin, not more than 5% by weight of a polymerization inhibitor, such as hydroquinone, hydroquinone monomethyl ether, p-benzoquinone, methylhydroquinone or the like, may be contained in the resin. In addition to the above described additives, discoloration-preventing agent, stabilizer and the like may be optionally added to the resin.

An explanation will be made with respect to a method for producing a sandwich glass by the use of the above described resin as an intermediate layer. When the resin has a low viscosity and has a satisfactorily high fluidity at room temperature, a spacer having a given thickness is arranged on the edge portion of one of the glass plates, the resin is poured into the area surrounded by the spacer, another glass plate is disposed on the resin and pressed to spread forcedly the resin over the whole area surrounded by the spacer and to flow out excess resin, the two plates are clamped and fixed together at their edge portions, and then ultraviolet ray or the like is irradiated to the glass assembly to photoset the resin. Alternatively, two glass plates are fixed with each other at their peripheries and spaced apart by a given distance by means of a gasket or the like inserted therebetween, the glass assembly is erected vertically, the resin is poured into the space formed between the glass plates from the bottom portion while keeping the resin from being mixed with air, and the resin is photoset. While, when the resin has a high viscosity and is not fluid at room temperature, the resin is formed into a sheet by means of a roll mill, extruder or press, the sheet is put between two glass plates, and the plates are pressed and bonded to the resin by a proper means, and then the resin is photoset. During the above described course of the production of sandwich glass, the resin does not cure unless light is irradiated to the resin. Therefore, when air bubbles have been formed or other troubles have occured, the stuck glasses can be peeled off and again stuck to each other. In the curing of the resin, ionizing radiations, such as X-ray, electron beam and the like can be used in addition to ultraviolet ray and visible ray.

The following example is given for the purpose of illustration of this invention and is not intended as a limitation thereof.

EXAMPLE

Two photosensitive resin compositions A and B and a thermosetting resin composition C as a comparison were produced according to the compounding recipe shown in the following Table 1, and three kinds of sandwich glasses were produced by the use of each resin composition as an intermediate layer, and the performances of the sandwich glasses were evaluated.

TABLE 1

| Photosensitive resin composition A | Photosensitive resin composition B | Thermosetting resin composition C |
| --- | --- | --- |
| Modified liquid polyisoprene*: 50 parts | Modified cis-1,4-polybutadiene**: 40 parts | Polyvinylbutyral resin***: 100 parts |
| Cyclohexyl methacrylate: 50 parts | Cyclohexyl methacrylate: 55 parts | Dibutyl phthalate (plasticizer): 20 parts |
| γ-Glycidoxypropyl-trimethoxysilane: 2 parts | 2-Hydroxyethyl methacrylate: 5 parts | |
| Benzophenone: 1 part | γ-Methacryloxy-propyl-trimethoxy-silane: 1 part | |
| | Benzoin propyl ether: 1 part | |

Note:
In The above Table 1, "parts" means by weight
*Addition product of methacrylic acid to LIR 50 (MW = 47,000) made by Kuraray Co., which product contains 1 molecule of methacrylic acid per 1,000 of the molecular weight of LIR 50.
**Addition product of methacrylic acid BR-01 made by Japan Synthetic Rubber Co., which product contains 1 molecule of methacrylic acid per 3,000 of the molecular weight of BR-01.
***S-LEC BMS made by Sekisui Chemical Co.

(1) Production of resin composition

Following the compounding recipes shown in Table 1, the resin composition A was produced in a vacuum vessel provided with a stirrer, the resin composition B was produced at room temperature by means of a kneader, and the resin composition C was produced by means of a roller kept at 130° C.

(2) Production of sandwich glass (a) Sandwich glass using resin composition A

A spacer having a thickness of 0.6 mm was arranged on the periphery of an ordinary glass plate having dimensions of 300×300×2 mm, which had previously been washed with water and dried, and a resin composition A was poured onto the center portion of the glass plate. Another glass plate same as the glass plate as described above was placed on the resin composition, pressed so that air bubbles would not be formed, and after resin composition which projected from the glass plates was removed, the two glass plates were fixed and bonded with each other through the resin composition. Ultraviolet ray was irradiated to one surface of the glass assembly by means of a 400 W mercury lamp for 10 minutes from a distance of 15 cm to photoset the resin composition.

(b) Sandwich glass using resin composition B

Resin composition B was press molded into a sheet having a thickness of 0.7 mm, and sandwiched between two ordinary glass plates having the same dimension as described above. The resin composition which projected out of the glass plates was cut off, a spacer having a thickness of 0.6 mm was put between the two glass plates at the peripheral portion, the glass plates were bonded under pressure, and then the resin composition was photoset under the same condition as described above.

(c) Sandwich glass using resin composition C

Resin composition C was press molded into a sheet having a thickness of 0.7 mm and sandwiched between two ordinary glass plates having the same dimensions as described above. The resin composition which projected out of the glass plates was cut off, a spacer having a thickness of 0.6 mm was put between the two glass plates at the peripheral portion, and the glass plates were bonded at 130° C. under pressure.

(3) Inpact test

A steel ball having a weight of 225 g and a smooth surface was dropped from a height of 5 m to the center portion of a sandwich glass by natural gravity according to JIS R3025 to effect an impact test of the sandwich glass.

The maximum value of the impact force of the steel ball at the collision with the sandwich glass was measured by means of an accerelation meter provided at the upper portion of the steel ball. The penetrated distance of the steel ball into the glass was measured by photographing the penetrated distance in the horizontal direction at the impact test at a film speed of about 20,000 pictures/sec by means of an ultra-high speed camera. The obtained results are shown in Table 2.

TABLE 2

| Intermediate layer | Impact force (kg) | Penetrated distance of steel ball* (%) |
| --- | --- | --- |
| Resin composition A | 564 | 77.6 |
| Resin composition B | 572 | 68.9 |
| Resin composition C | 713 | 44.7 |

*Ratio in percentage of the maximum value of the penetrated distance of a steel ball to the diameter thereof.

The steel ball did not penetrate through any of the sandwich glasses. Resin compositions A and B were superior in the impact absorbing ability to resin composition C. In the sandwich glasses using resin compositions A and B, peeling of the resin from glass, breakage of resin layer, and scattering of glass did not occur. While, in the sandwich glass using resin composition C, peeling of resin from glass occurred slightly.

(4) Light resistance test and heat resistance test according to JIS R3025

The light resistance of a sandwich glass was evaluated by the variation of transmittance of light (visible ray) before and after irradiation of ultraviolet ray from a distance of 15 cm for 100 hours by means of a 400 W mercury lamp. The heat resistance of a sandwich glass was evaluated by observing by naked eye the variation of the state of the sandwich glass before and after the glass was immersed in warm water kept at 65° C. for 3 minutes and then in boiling water for 2 hours. The obtained results are shown in the following Table 3.

TABLE 3

| | Light resistance (transmittance) (%) | | Heat resistance (observation by naked eye) |
| --- | --- | --- | --- |
| Intermediate layer | Initial value | After 100 hours | |
| Resin composition A | 86.4 | 88.5 | no change |
| Resin composition B | 88.7 | 90.7 | no change |
| Resin composition C | 92.0 | 80.6 | — |

(5) Adhesive force test

Two glass plates having dimensions of 45×25×5 mm were previously washed with water and dried, and a resin layer having a thickness of 0.05 mm and an area of 1.0 cm² was formed between the two glass plates. An ultraviolet ray was irradiated to the glass assembly from a distance of 15 cm for 15 minutes by means of a 400 W mercury lamp to bond the glass plates to each other.

The resulting test piece was sheared at a rate of 50 mm/min under pressure to measure the compression shear strength of the resin. Further, a test piece produced in the same manner as described above was immersed in hot water kept at 50° C. for 7 days, and then the compression shear force of the resin layer was measured. The obtained results are shown in the following Table 4.

TABLE 4

| | Compression shear force (kg/cm$^2$) | |
|---|---|---|
| Intermediate layer | Initial value | After immersed in warm water for 7 days |
| Resin composition A | 155 | 125 |
| Resin composition B | 203 | 198 |
| Resin composition C | 80 | 20 |

Note:
In all test pieces, breakage occurred in the glass portion.

What is claimed is:

1. A sandwich glass comprising glass plates and an intermediate layer interposed therebetween, said intermediate layer being formed by photosetting a photosensitive resin consisting essentially of a high polymer having acryloyloxy group- or methacryloyloxy group-containing groups represented by the following formulae (I)–(III), $$CH_2=\overset{R}{\underset{|}{C}}-COO- \quad (I)$$

$$CH_2=\overset{R}{\underset{|}{C}}-COO+CH_2\!\!\overline{\phantom{x}}_{\!\!n}O- \quad (II)$$

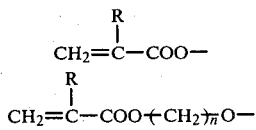

$$CH_2=\overset{R}{\underset{|}{C}}-COO+(CH_2\!\!\overline{\phantom{x}}_{\!\!m}O)_l \quad (III)$$

wherein R represents a hydrogen atom or methyl group, n represents a positive integer of 2–5, m represents a positive integer of 1–4 and l represents a positive integer of 1–30, which is obtained by adding acrylic acid, methacrylic acid, or ester thereof, having a terminal active hydrogen atom, to a high polymer having olefinically unsaturated double bonds in in the presence of an alkyl hypohalite or a N-haloamide compound, and at least one acryloyloxy group- or methacryloyloxy group-containing compound selected from acrylic acid, methacrylic acid and their derivatives, and wherein the mixing ratio of the high polymer to the acryloyloxy group- or methacryloyloxy group-containing compound is within the range of 90/10-5/95 in weight ratio and the amount of the acrylolyoxy or methacryloyloxy groups in the high polymer is at least one group per 50,000 of the high polymer molecular weight.

2. A sandwich glass according to claim 1, wherein the derivative of acrylic acid or methacrylic acid is an ester or amide thereof.

3. A sandwich glass according to claim 1, wherein the high polymer has olefinically unsaturated double bonds.

4. A sandwich glass according to claim 1, wherein the high polymer is elastomeric high polymer.

5. A sandwich glass according to claim 1, wherein the amount of the acryloyloxy or methacryloyloxy groups in the high polymer is at least one group per 20,000 of the high polymer molecular weight.

* * * * *